United States Patent Office 3,017,687
Patented Jan. 23, 1962

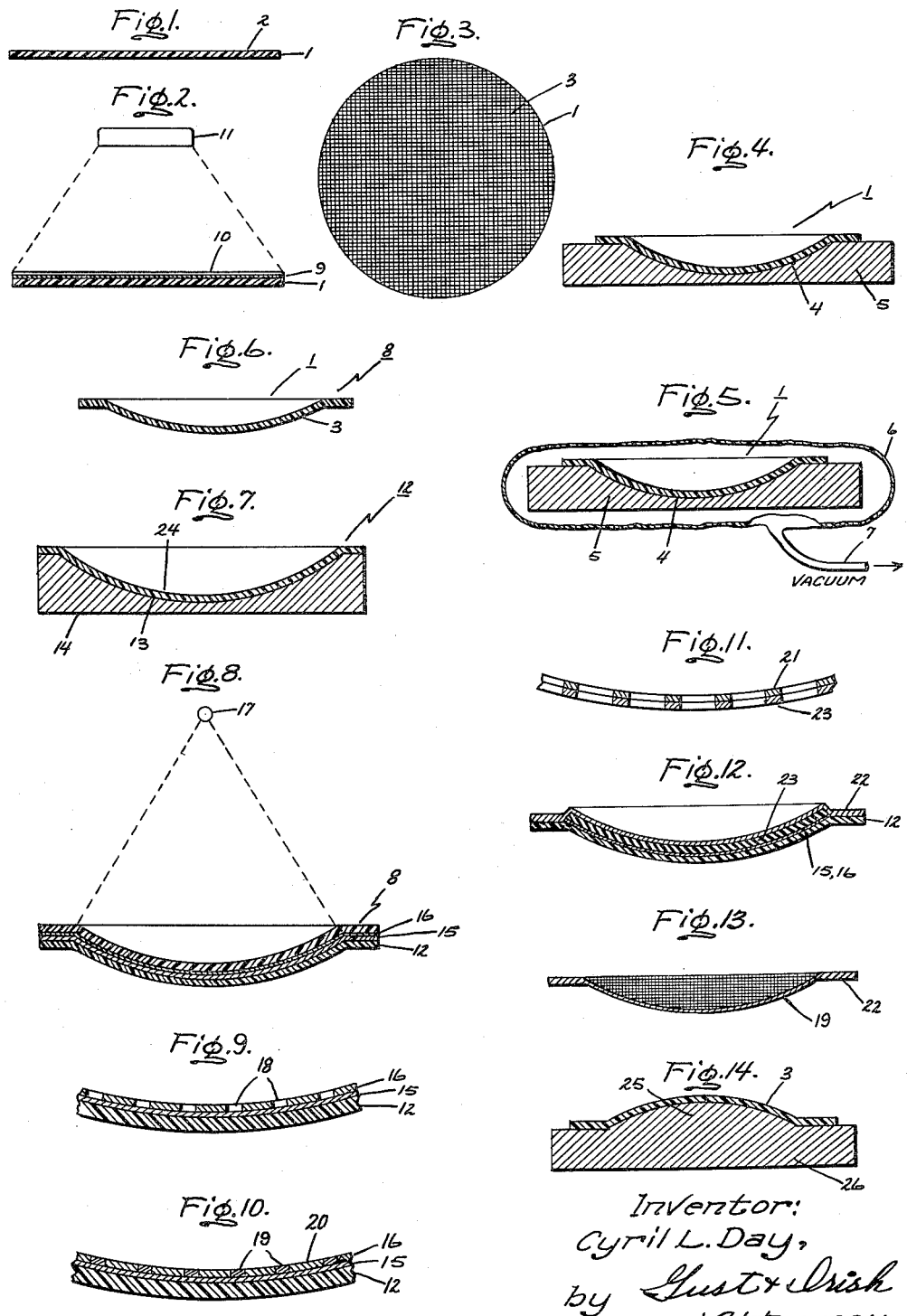

3,017,687
METHOD OF MAKING BOWL-SHAPED FINE MESH SCREENS FOR ELECTRON DISCHARGE TUBES
Cyril L. Day, Huntington, Ind., assignor to International Telephone and Telegraph Corporation
Filed Sept. 3, 1957, Ser. No. 681,497
2 Claims. (Cl. 29—25.18)

This invention relates to electron discharge tubes, such as storage tubes, and more particularly to a method of making bowl-shaped fine mesh metal screens for use in such tubes.

Certain types of electron discharge tubes, for example, barrier grid storage tubes, employ a fine mesh metal screen; in barrier grid storage tubes, the screen is arranged on one side of a layer of dielectric material with a metal plate being arranged on the other side of the dielectric layer to form a target electrode. In my co-pending application, Serial No. 668,671, filed June 28, 1957, and assigned to the assignee of the present application, I have described and illustrated a bowl-shaped target electrode for barrier grid storage tube; in that application, a bowl-shaped metal backing plate is provided having a dielectric layer disposed within the bowl and with a fine mesh metal screen disposed on the side of the dielectric layer remote from the bowl-shaped backing plate.

While relatively fine mesh metal screens have been formed of woven wire, or formed by etching sheet metal in a pattern, the best fine mesh metal screens presently available in the range from 300 to 2,000 meshes per inch are produced by a ruling process. In this technique, a glass master is coated with wax and the mesh pattern is ruled thereon. After this ruling, the glass is etched and then the ruling is filled with an opaque filler. From this ruling, an electroplating matrix is produced by a photoresist technique on a copper plate and a screen of the desired pattern is then plated on this matrix. Screens produced by this process have, in the past, been flat and thus in order to provide a bowl-shaped screen it has been necessary to form the initially flat screen into bowl-shape; my co-pending application, Serial No. 668,643, filed June 28, 1957, now abandoned, and also assigned to the assignee of the present application, describes and illustrates apparatus for forming such bowl-shaped screens. It is, however, desirable initially to form a fine mesh metal screen in bowl-shape, and since, as indicated, the best fine mesh metal screens are formed by the photo-resist technique, it is desirable to provide a process employing that technique to produce an initially bowl-shaped fine mesh metal screen, thereby eliminating the forming operation to provide the bowl-shaped configuration subsequent to initial production of the screen.

I have found that bowl-shaped fine mesh metal screens may be initially formed by providing a first bowl formed of transparent material and having a fine mesh grid of opaque lines thereon; such a grid may be ruled directly into the flat blank before forming the bowl with the ruled grooves being filled with opaque material, or the grid may be photographically applied to the flat blank which is then shaped to the bowl. A second bowl is provided having its inner surface conductive and coated with a photosensitive material, e.g., photo-resist. The first bowl with the grid thereon is placed within the second bowl and the two bowls are then exposed to light, preferably ultraviolet. The first bowl, which is a master, is then removed from the second bowl and the photosensitive material is developed. The unexposed portions of the photosensitive material on the second bowl are then removed to expose the conductive surface and metal is deposited on the conductive surface on the lines from which the photosensitive material has been removed thereby to form a fine mesh metal screen; the second bowl thus forms a matrix on which the fine mesh metal screen is formed by plating. The exposed portions of the photosensitive material which are now in the openings of the fine mesh metal screen are removed and the second bowl is dissolved thereby leaving a bowl-shaped fine-mesh metal screen.

It is accordingly an object of this invention to provide an improved process for making a bowl-shaped fine mesh metal screen.

Another object of this invention is to provide an improved process for making a fine mesh metal screen which is initially bowl-shaped.

A further object of this invention is to provide a process for making a bowl-shaped fine mesh metal screen employing the photo-resist technique.

The above mentioned and other features and objects of this invention and the manner of attaining them will become more apparent and the invention itself will best be understood by reference to the following description of an embodiment of the invention taken in conjunction with the accompanying drawings, wherein:

FIG. 1 is a cross-sectional view of one form of ruled blank from which the master employed in my process is formed;

FIG. 2 is a schematic cross-sectional view showing a different method of making a ruled master employed in the process of my invention;

FIG. 3 is a plan view of the ruled masters of FIGS. 1 and 2;

FIG. 4 is a cross-sectional view showing the blanks of FIGS. 1 or 2 after sagging into a bowl-shaped mold;

FIG. 5 is another cross-sectional view showing the sagging of the blank for the master into a mold under a vacuum;

FIG. 6 shows the resulting master employed in the process of my invention;

FIG. 7 is a cross-sectional view showing the sagging of a blank into a bowl-shaped mold to form the matrix employed in the process of my invention;

FIG. 8 is a schematic cross-sectional view showing the positioning of the master within the matrix and the exposure of the resulting assembly to light thereby to develop the photo-resist material on the matrix;

FIG. 9 is a fragmentary cross-sectional view (greatly enlarged) showing the matrix after development of the photo-resist material and the removal of the unexposed portions;

FIG. 10 is another fragmentary cross-sectional view (also greatly enlarged) showing the matrix with metal deposited in the lines formed by removal of the unexposed photo-resist material;

FIG. 11 is still another fragmentary cross-sectional view (also greatly enlarged) showing the resulting fine mesh metal screen which has been thickened by subsequently depositing metal thereon;

FIG. 12 is a cross-sectional view showing a modification of my invention in which the relatively thick annular flange is formed around the fine mesh metal screen;

FIG. 13 is a cross-sectional view showing the resulting fine mesh metal screen provided in my invention including the relatively thick annular flange provided in accordance with FIG. 12;

FIG. 14 is a cross-sectional view showing the sagging of the blank for the master and/or matrix onto a convex rather than into a concave mold.

Figure 15:
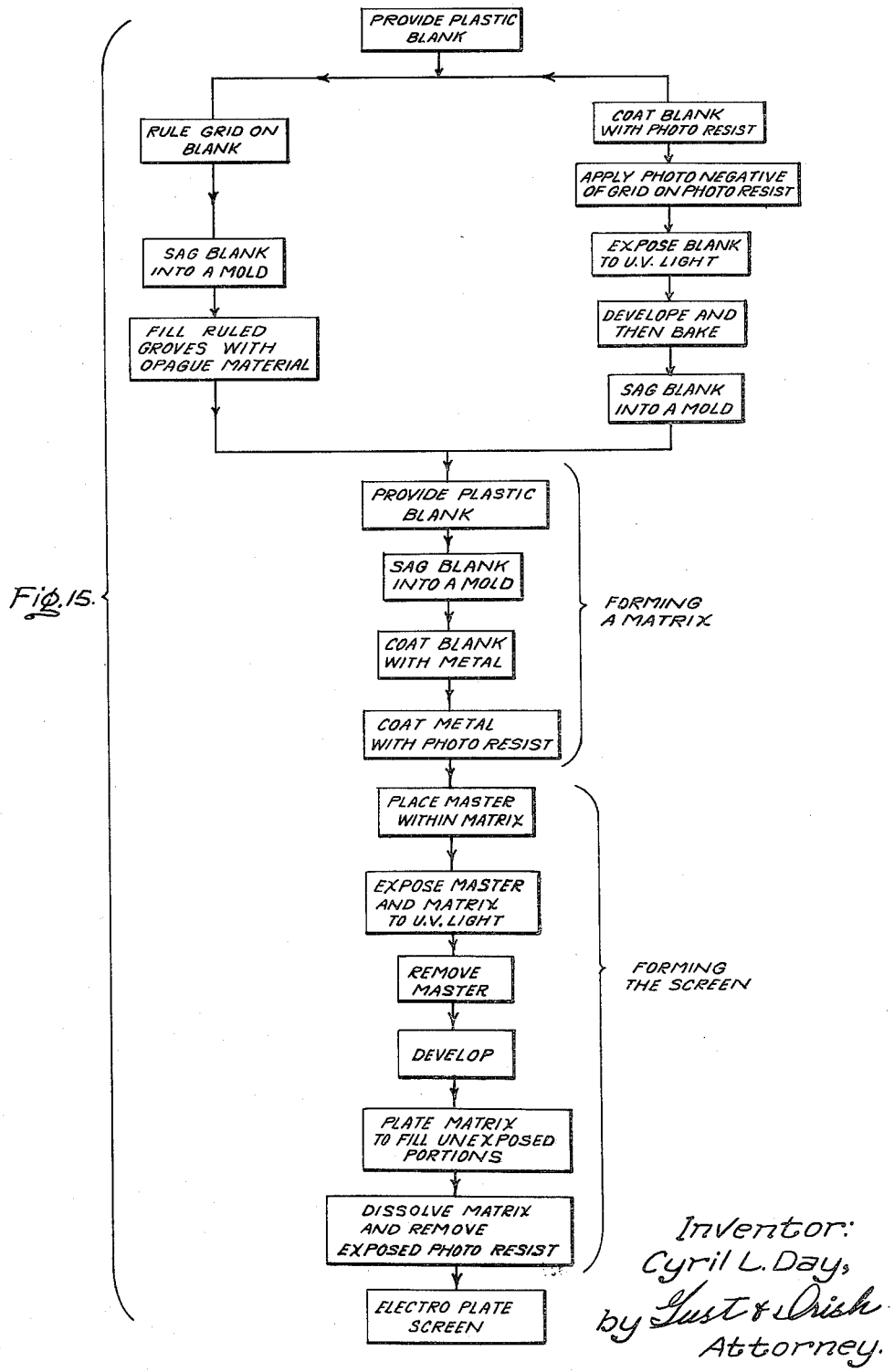
FIG. 15 is a chart showing the steps employed in practicing my improved process for forming bowl-shaped fine mesh metal screens.

Referring now to the drawings, in order to form a master which may be used in producing any quantity of fine mesh metal screens, I provide an annular blank 1 formed of a transparent low temperature-deforming material, such as Lucite. This blank may be on the order of one-eighth inch in thickness and four or five inches in diameter and a fine mesh grid 3 is ruled in the surface 2, as shown in FIG. 3. The blank 1 is then sagged into a bowl-shaped cavity 4 of mold 5 by the application of suitable heat; the ruled side of the bowl 1 is disposed on the side of the blank 1 facing the mold cavity 4. It may be desirable to place some pressure on the blank 1 during the sagging operation and therefore the mold 5 with the blank 1 thereon may be placed in a suitable bag 6 formed of such material as polytetrafluoroethylene which is evacuated through a vacuum line 7. It will be readily understood that the heat applied during the sagging operation is dependent upon the specific transparent material used for the blank 1. After the sagging operation, the resulting bowl-shaped master 8 is removed from the mold and the resulting grooves in the outer surface are filled with opaque material.

The grid 3 on the blank 1 may be formed photographically as shown in FIG. 2. Here, the blank 1 has a relatively thin coating 9 of photo-resist material applied to one surface thereof; photo-resist is a photosensitive lacquer which after exposure to light is developed, the unexposed portions of which can be removed by washing with a solvent. On the layer of photo-resist 9 is applied a photographic or metal negative 10 having the desired fine mesh grid thereon and the resulting sandwich is exposed to ultraviolet light from a source 11. Here, the photo-resist material should initially be opaque in color or made opaque by a subsequent chemical treatment; this is because grooves are not provided which can be filled with opaque material and thus it is necessary that the resulting lines be opaque. After exposing the sandwich to ultraviolet light, the film 10 is removed and the blank 1 with exposed photo-resist layer 9 thereon is developed and then baked. The blank 1 with the grid 3 photographically formed thereon is then sagged into the bowl-shaped mold as described above.

In order to form the matrix, I again employ a blank 12 of low temperature-deforming material, such as Lucite, which is sagged into a bowl-shaped cavity 13 in mold 14 as shown in FIG. 7. The resulting bowl-shaped part has a relatively thin layer 15 of metal, such as aluminum, approximately .0005 inch thick, formed on its inner surface, as by evaporation, and a relatively thin layer of photo-resist material 16, for example, .001 inch thick, is deposited on the metal layer 15. The bowl-shaped master 8 is then positioned within the matrix with the grid 3 in contact with the photo-resist layer 16. In order to provide the desired intimate contact of the master 8 with the matrix, it may be desirable to employ the evacuation technique of FIG. 5. The resulting sandwich of the master 8 and the matrix composed of the blank 12, conductive layer 15 and photo-resist layer 16 is then exposed to ultraviolet light from a point source 17 and after exposing, the master 8 is removed and may be subsequently used in the production of further screens.

The matrix is then washed and the unexposed portions of the photo-resist layer 16, which in this case are the lines forming the grid, are washed and thereby removed, e.g., with a solvent. As seen in FIG. 9, the washing away of the unexposed portions of the photo-resist layer 16 leaves grooves 18 exposing the metal coating 15 and forming a grid corresponding to the fine mesh grid 3 on the master 1. Metal is then deposited in the grooves 18, as by plating, to fill the grooves as at 19 in FIG. 10. Since the grooves 18 are interconnected to form a grid corresponding to grid 3 in the master 1, the plated metal portions 19 are thus interconnected to form a fine mesh metal screen.

In order to strip the resulting screen 19 from the matrix, the bowl-shaped plastic matrix 12 is dissolved in a suitable solvent such as a ketone. The portions 20 of the photo-resist layer 16 intermediate the screen 19 are then dissolved, as with trichlorethylene, and any remnants of the metal layer 15 which were not removed with dissolving of the matrix 12 may be removed with a weak alkali solution. The thickness of the resulting fine-mesh bowl-shaped metal screen 19 may be increased as desired, as at 21 in FIG. 11, in any suitable manner, as by plating or evaporating metal from a point source as described and illustrated in co-pending application, Serial No. 672,754, of Michael F. Toohig, filed July 18, 1957, and also assigned to the assignee of the present application. In the plating operation, the matrix may be initially flashed with metal, such as copper, to obtain good conduction, and then the screen is built up by plating with copper or other suitable metal such as nickel, until the desired thickness is obtained in the mesh.

It may be desirable to provide a relatively thick annular flange 22 around the periphery of the bowl-shaped fine-mesh metal screen 19. In order to provide such a flange 22, after the initial plating operation, to build up the screen 19 in the groove 18 in the photo-resist layer 16, the matrix with the plated screen thereon is covered by a bowl-shaped mask 23 and the plating is then continued to build up the annular flange portions 22.

While I have formed the master 8 utilizing a Lucite blank 1, it will be readily apparent that any transparent material which can be easily deformed at a low temperature can be employed. Further, while as a matter of convenience, I have employed Lucite as the support 12 of the matrix, it will again be apparent that any material which can be deformed at a low temperature, which will present a smooth surface, which is stable in a vacuum and can be dissolved away without harming the metal screen can be employed. In this case, it is obvious that the support portion 12 of the matrix need not be transparent. I have also found that it may be desirable after the blank 12 has been sagged into the mold 14 to machine the inner surface 24 to obtain the correct dimensions; it is generally desired that the resulting fine-mesh metal screen is spherical in configuration and thus some machining of the inner service 24 of the support 12 of the matrix may be desirable.

It will also be readily apparent that both the bowl-shaped master 8 and the bowl-shaped support 12 of the matrix could be preformed of a suitable plastic material, such as Lucite, as by pressure molding.

While I have referred to aluminum as the conducting layer 15, it will be readily apparent that other metal coatings may be equally advantageously employed and that this coating may be applied in any suitable manner, as by evaporating, or electrostatic deposition. In addition, while I have shown both the master and the support of the matrix as being sagged into a concave mold cavity in a mold, it will be readily apparent that either the master or the support portion of the matrix may be sagged onto a convex mold portion 25 of mold 26 as shown in FIG. 14. Here, in the case of the master, the opaque grid 3 will preferably be disposed on the outer surface of the blank rather than adjacent the mold surface as in the case of a concave mold cavity. This is due to the fact that it is desirable to have the opaque lines forming the grid disposed immediately adjacent the photo-resist layer 16 when the master is placed in the matrix as shown in FIG. 8.

While I have described above the principles of my invention in connection with specific apparatus, it is to be clearly understood that this description is made only by way of example and not as a limitation to the scope of my invention.

What is claimed is:
1. The method of making a bowl-shaped fine mesh metal screen comprising the steps of: providing a blank formed of a transparent material; ruling a fine mesh grid on one side of said blank; deforming said blank into bowl-shape to form a first bowl; filling the ruled grooves in said blank with opaque material; providing a second bowl having a conductive inner surface; coating the inner surface of said second bowl with photosensitive material; placing said first bowl with said grid thereon within said second bowl; exposing said bowls to light; removing said first bowl from said second bowl; developing said photosensitive material; removing the unexposed portion of said photosensitive material to expose said conductive surface; depositing metal on said conductive surface in the lines from which said photosensitive material has been removed thereby to form a fine mesh metal screen; removing the exposed portion of said photosensitive material; and dissolving said second bowl thereby leaving said fine mesh metal screen.

2. The method of making a bowl-shaped fine mesh metal screen comprising the steps of: providing a first bowl formed of transparent material having a fine mesh grid formed of opaque lines thereon; providing a second bowl having a conductive inner surface; coating the inner surface of said second bowl with photosensitive material; placing said first bowl with said grid thereon within said second bowl; exposing said bowls to light; removing said first bowl from said second bowl; developing said photosensitive material; removing the unexposed portion of said photosensitive material to expose said conductive surface; plating metal on said conductive surface in the lines from which said photosensitive material has been removed thereby to form a fine mesh metal screen; placing a mask over said photosensitive material and plated screen; continuing plating to form a relatively thick flange portion around said screen; removing said mask; removing the exposed portion of said photosensitive material; and dissolving said second bowl thereof leaving said fine mesh metal screen.

References Cited in the file of this patent

UNITED STATES PATENTS

| | | |
|---|---|---|
| Re. 18,918 | Sherts | Aug. 22, 1933 |
| 544,248 | Cutler | Aug. 6, 1895 |
| 1,161,998 | Titus et al. | Nov. 30, 1915 |
| 2,374,040 | Ryan | Apr. 17, 1945 |
| 2,537,329 | Campbell | Jan. 9, 1951 |
| 2,765,230 | Tinklenberg | Oct. 6, 1956 |

FOREIGN PATENTS

| | | |
|---|---|---|
| 733,022 | Great Britain | July 6, 1955 |